L. B. CURTIS.
MACHINE FOR AUTOMATICALLY CUTTING OFF PIPE, BARS, &c.
APPLICATION FILED MAY 8, 1915.

1,160,387.

Patented Nov. 16, 1915.
2 SHEETS—SHEET 1.

WITNESS
H. A. Lamb

INVENTOR
L. B. Curtis.
By
ATTORNEY

UNITED STATES PATENT OFFICE.

LEWIS B. CURTIS, OF BRIDGEPORT, CONNECTICUT.

MACHINE FOR AUTOMATICALLY CUTTING OFF PIPE, BARS, &c.

1,160,387.

Specification of Letters Patent.  Patented Nov. 16, 1915.

Application filed May 8, 1915. Serial No. 26,760.

*To all whom it may concern:*

Be it known that I, LEWIS B. CURTIS, a citizen of the United States, residing at the city of Bridgeport, county of Fairfield, and State of Connecticut, have invented certain new and useful Improvements in Machines for Automatically Cutting Off Pipe, Bars, &c.; and I do declare the following to be a full, clear, and exact description of the invention, such as will enable others skilled in the art to which it appertains to make and use the same.

My invention relates to machines for automatically cutting off pipe, bars, &c., and has for its object to provide a machine of this description in which a plurality of cutters is preferably employed, each cutter being gradually and constantly advanced, so that the pipe is not only rapidly cut off but the cutting operation is performed in a very smooth and efficient manner.

Figure 1:
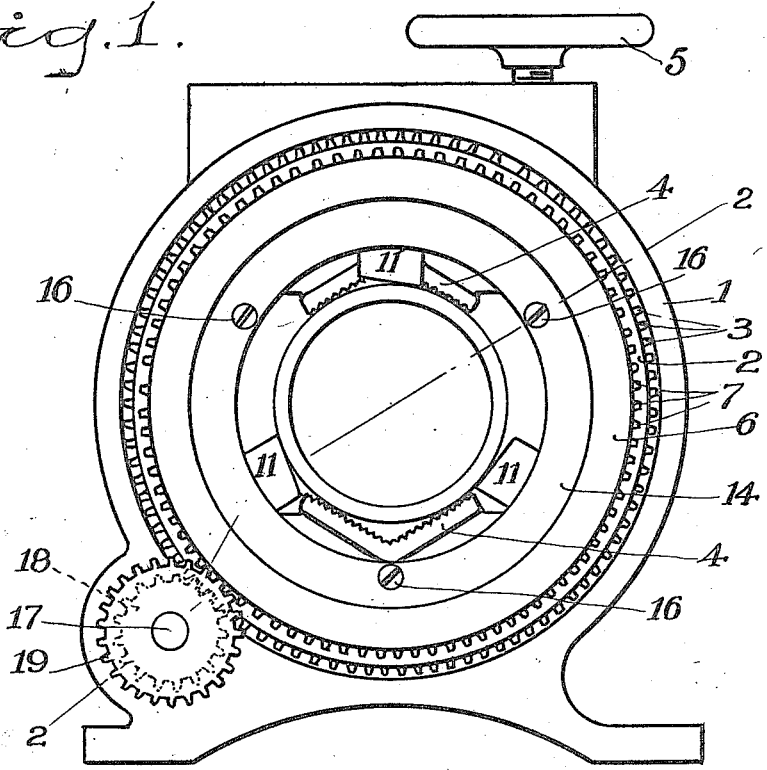
Figure 2:
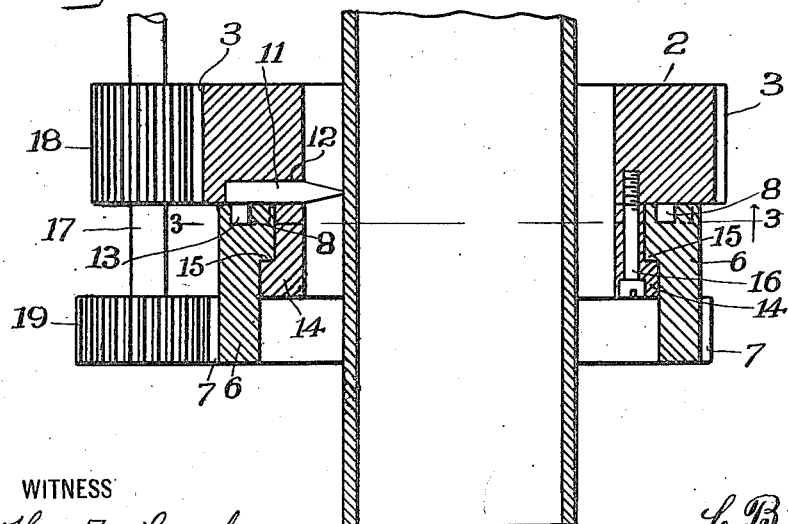
Figure 3:
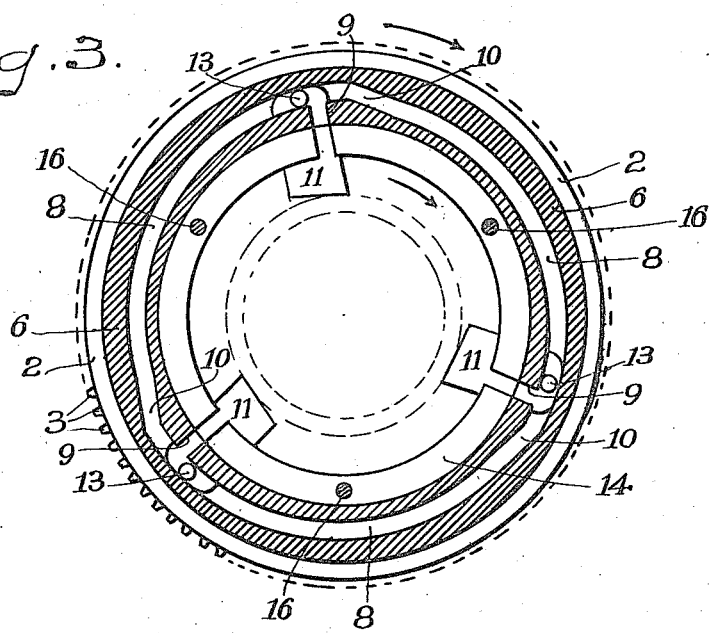
Figure 4:
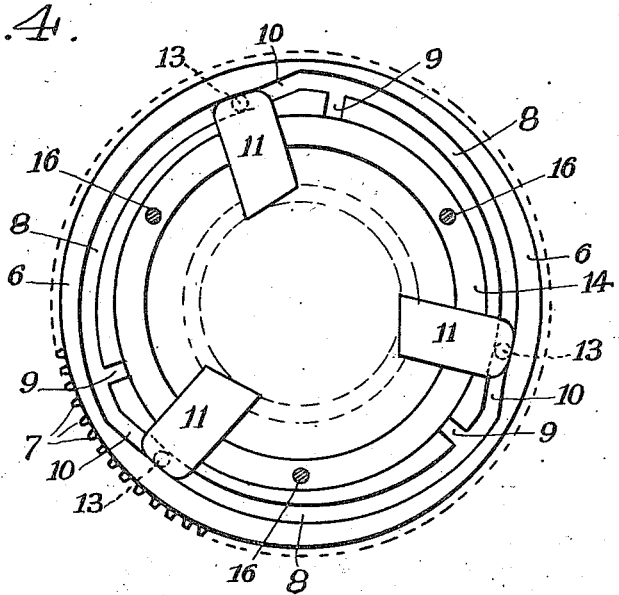

In the accompanying drawing which forms a part of this application Figure 1 is a front elevation of a machine such as I prefer to employ for carrying out my invention—Fig. 2 a section at the line 2—2 of Fig. 1—Fig. 3 a section at the line 3—3 of Fig. 2, and Fig. 4 is a rear face view of the rotary cam and keeper rings and showing the cutting tools assembled in proper relation thereto.

Similar numerals of reference denote like parts in the several figures of the drawing.

The type of machine which I prefer to employ is that which is now commonly used for pipe threading and comprises a rotary cutter carrying ring having peripheral gear teeth and journaled circumferentially within a surrounding casing, a suitable vise being employed for clamping the pipe.

1 is the casing, 2 the rotary cutter carrying ring having gear teeth 3 on its periphery and journaled circumferentially within the casing so as to be capable of free rotary movements.

I employ an ordinary vise 4 operated by a hand wheel 5 for the purpose of holding the pipe or bar to be cut, and in this connection would say that this vise is very old and will require no further description, and, moreover, the pipe or bar may be held in any cuitable manner independent of the machine, if desired.

6 is the cam ring which likewise has gear teeth 7 on its periphery and has cut in its rear face cam grooves 8, which, in the present instance, are three in number, since I prefer to employ three cutting tools. These cam grooves are preferably continuous, and open one within the other, and at the end of each groove I prefer to utilize a gate 9 for the purpose presently to be explained, and at one end of each cam groove, which contacts with the cutting tools so as to finally throw the latter inward to their utmost extent, is an abrupt outwardly extending portion 10 which is instrumental in rapidly withdrawing the cutting tools after they have performed their cutting operation and immediately before they have commenced to be acted upon by subsequent cam grooves 8 for the cutting off of a subsequent pipe.

11 are the cutting off tools which are contained within ways 12 in the cutter carrying ring so that they will partake of the rotary movements of such ring, but these tools are capable of free lengthwise sliding movements within these ways, and said tools have a small pin projection 13 which extends outward within the several cam grooves 8.

The cam ring itself is confined against the face of the cutter carrying ring by means of a shouldered keeper ring 14 that engages against an annular ledge 15 in the inner face of the cam ring, this keeper ring being secured to the cutter carrying ring by means of screws 16.

While the cam ring 6 is confined in the manner above set forth in position against the face of the cutter carrying ring 2 by means of the keeper ring 14, the cam ring itself is capable of free rotary movements independent of the cutter carrying ring, and it will therefore be clear that if, during the rotation of the ring which carries the cutting tools, the cam ring was moved at a speed slightly greater than that of the cutter carrying ring, the cam grooves 8 would act on the pins 13 and gradually force the cutting tools inwardly.

In order to bring about the proper relative rotary movements of the cutter carrying ring 2 and the cam ring 6, the latter is preferably made smaller in diameter, and carried by the power shaft 17 are two pinions 18, 19, the former being the smaller and engaging with the peripheral teeth on the cutter carrying ring, while the pinion 19 is the larger and engages with the peripheral teeth on the cam ring. It will therefore be clear that the revolution of the power shaft will cause the cutter carrying ring to revolve and carry with it the cutting tools, while at the same time the cam ring will likewise be revolved at a slightly accelerated speed, which latter, of course, will be predetermined and may be regulated in any well known and ordinary manner.

The gradual advance of the cam ring during the simultaneous revolution of the two rings 2 and 6, will cause the cutting tool to be constantly, uniformly and gradually fed inwardly against the pipe or bar that is being cut off, and as all three cutters are working at the same time the cutting off operation is very rapidly and smoothly performed.

In assembling the parts of my improvement the cutters may be inserted through the ways 12 with the pins extending within the gates 9 until said pins have come into the cam grooves, and the cutters may be removed in like manner, but, of course, these ways are not absolutely necessary, being merely convenient for the purpose of introducing and removing the cutters, and I do not wish to be limited in this respect.

When, during the rotation of the rings, the pins 13 have reached the abrupt portions 10, the continued rotation of these rings will cause said portions to act on the pins to withdraw the cutting tools, and will also establish the proper relations between the pins and succeeding cam grooves, because the several cam grooves lead into each other and form one continuous groove.

While I have shown and described the cam ring as of smaller diameter than the main cutter carrying ring and I have utilized a larger pinion engaging with the peripheral teeth of this cam ring in order to advance the latter a little faster than the cutter carrying ring, it will, of course, be clear that I can make the diameter of this cam ring equal to or greater than the cutter carrying ring, and can insure its retarded or accelerated speed by any suitable and well known system of gearing, all of which forms no part of my present invention.

I have illustrated and described "cam grooves" merely because they are more convenient than an ordinary cam surface since they will operate to effect both the inward and outward movements of the cutter tools, and also, the projections from these tools being extended into the grooves, the tools themselves cannot drop out of the machine when they are unsupported by the pipe or bar to be cut, but, of course, since the outer wall of the cam groove feeds the cutter tool inwardly to perform the cutting off operation, my invention is not limited to the employment of the grooves, it being merely necessary that the cutting tools should be acted on by the cam surfaces that are carried by the ring 6. Also, while I have shown three cutting tools since I prefer to employ a plurality of such tools because they would perform the work of cutting off much more quickly than by the use of a single cutting tool, nevertheless, it is fully within my invention to employ a single cutting tool, in which instance the cam surface would extend throughout the entire circuit of the ring 6, or, if the cam surfaces were just as I have herein shown and described, it would be merely necessary to arrange the gearing so as to have a much less difference between the speed of the two rings. Furthermore, it will, of course, be obvious that if the direction of the cam surfaces or grooves 8 be reversed, then the speed of the cam ring must be less than that of the cutter carrying ring, and therefore I do not wish to be limited in this respect, because it is merely necessary, in carrying out my invention, that the speeds of the two rings should be different.

Having thus described my invention what I claim as new and desire to secure by Letters Patent is:—

1. A machine of the character described, comprising a rotary cutter carrying ring, cutter tools slidably carried by said ring, a rotary cam ring having individual cam surfaces that lead into each other to form a continuous circuit, connections between said tools and surfaces, and means for imparting different rotary speeds to said rings.

2. A machine of the character described, comprising a casing, a rotary cam ring having therein a continuous cam groove composed of individual cam grooves that each lead into a succeeding cam groove, a rotary cutter carrying ring provided with radially disposed ways, cutting tools slidably carried within said ways and having pin projections that extend within said grooves, and means for imparting different rotary speeds to said rings.

3. A machine of the character described, comprising a casing, a rotary cutter carrying ring, cutter tools slidably carried by said ring, a rotary cam ring having continuous cam surfaces composed of individual cam surfaces leading one within the other, connections between said tools and surfaces, and means for imparting different rotary speeds to said rings.

4. A machine of the character described, comprising a casing, a rotary cutter carrying ring provided with radially disposed ways, cutting tools slidingly carried within said ways and having pin projections, a rotary cam ring having therein a continuous cam groove composed of individual cam grooves that each terminate in abrupt outwardly extending portions that lead into succeeding cam grooves, connections between said tools and groove, said cam ring secured to the cutter carrying ring but capable of independent rotation, and means for imparting different rotary speeds to said rings.

5. A machine of the character described, comprising a casing, a rotary cutter carrying ring provided with radially disposed ways, cutting tools slidably carried within said ways and having pin projections, a rotary cam ring having therein individual cam grooves within which said pins extend which grooves lead one within the other to form a continuous circuit, a keeper ring secured to the cutter ring and confining the cam ring in position against the face of the cutter carrying ring whereby said cam ring is capable of independent rotation, and means for imparting different speeds of rotation to said rings.

6. A machine of the character described, comprising a casing, a rotary cutter carrying ring having peripheral teeth and provided with radially disposed ways, cutting tools slidably carried within said ways and having pin projections, a rotary cam ring having a diameter less than that of the cutter carrying ring and provided with peripheral teeth and having therein cam grooves within which said pins extend, a keeper ring secured to the cutter carrying ring and confining the cam ring in position against the face of the cutter carrying ring whereby said cam ring is capable of independent rotation, and a power shaft carrying relatively small and large pinions adapted to engage respectively with the teeth on the cutter carrying ring and the cam ring whereby an accelerated speed is imparted to the latter.

In testimony whereof I affix my signature in presence of two witnesses.

LEWIS B. CURTIS.

Witnesses:
   F. W. SMITH, Jr.,
   M. T. LONGDEN.